Figure 1:
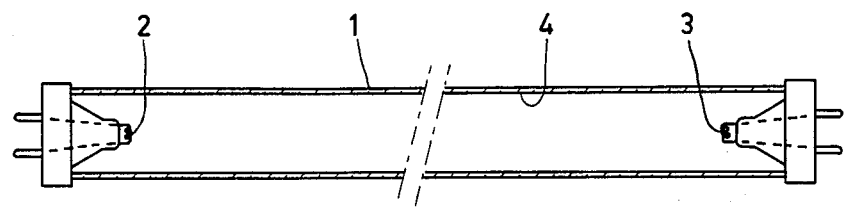

United States Patent [19]

Mulder et al.

[11] Patent Number: 4,541,811

[45] Date of Patent: Sep. 17, 1985

[54] METHOD OF MANUFACTURING A LOW-PRESSURE MERCURY VAPOR DISCHARGE LAMP AND LOW-PRESSURE MERCURY VAPOR DISCHARGE LAMP MANUFACTURED BY THIS METHOD

[75] Inventors: Berend J. Mulder; Sybrandus van Heusden, both of Eindhoven, Netherlands

[73] Assignee: U.S. Philips Corporation, New York, N.Y.

[21] Appl. No.: 469,538

[22] Filed: Feb. 24, 1983

[30] Foreign Application Priority Data

Mar. 10, 1982 [NL] Netherlands ............... 8200973

[51] Int. Cl.[4] ............................................. H01J 61/35
[52] U.S. Cl. ......................................... 445/26; 445/22; 313/493
[58] Field of Search ............... 445/26, 22, 1; 313/493, 313/634, 636; 65/30.13

[56] References Cited

U.S. PATENT DOCUMENTS

| 3,067,356 | 12/1962 | Ray ............................... 313/489 |
| 3,811,855 | 5/1974 | Carlson et al. ................. 65/30.13 |
| 4,255,687 | 3/1981 | Van Engelen et al. .......... 313/493 |
| 4,285,988 | 8/1981 | Ernsberger ..................... 65/30.13 |
| 4,289,991 | 9/1981 | Schreurs ......................... 313/493 |
| 4,344,016 | 8/1982 | Hoffman ......................... 313/493 |

FOREIGN PATENT DOCUMENTS 0121261 9/1980 Japan ................................ 313/493

Primary Examiner—Nicholas P. Godici
Assistant Examiner—Kurt Rowan
Attorney, Agent, or Firm—Robert S. Smith

[57] ABSTRACT

Method of manufacturing a low-pressure mercury vapor discharge lamp (1) comprising a discharge envelope, the glass wall of which comprises at least an (alkaline earth) alkali constituent, a silicon dioxide-containing transparent layer (4) being produced on the inner wall of the discharge envelope.

In the method, such a direct current is maintained through the glass that the (positive) (alkaline earth) alkali ions move away from the inner wall and upon heating the said silicon dioxide-containing transparent layer (4) is produced.

4 Claims, 2 Drawing Figures

METHOD OF MANUFACTURING A LOW-PRESSURE MERCURY VAPOR DISCHARGE LAMP AND LOW-PRESSURE MERCURY VAPOR DISCHARGE LAMP MANUFACTURED BY THIS METHOD

The invention relates to a method of manufacturing a low-pressure mercury vapor discharge lamp comprising a discharge envelope having a glass wall which comprises at least an alkali and/or an alkaline earth constituent, a silicon dioxide-containing transparent layer being produced on the inner surface of the glass wall. The invention further relates to a low-pressure mercury vapor discharge lamp manufactured by such a method. Such a method is known from U.S. Pat. No. 3,067,356.

The said Patent Specification discloses that the inner surface of the discharge envelope of the low-pressure mercury vapor discharge lamp is provided with a thin transparent protective layer consisting, for example, of silicon dioxide. According to the U.S. Patent, it is then avoided that the glass wall (which consists of a glass which is commonly used for lamps of this type, such as lime glass, which comprises a comparatively high percentage of alkali and/or alkaline earth constituents) exhibits a dark discoloration after a comparatively small number of operating hours of the lamp. This dark discoloration naturally results in loss of light and in an unaesthetic appearance of the lamp, in particular due to the fact that the dark discoloration occurs irregularly, for example, in the form of dark spots and dots. According to the U.S. Patent, the said spots and dots consist of compounds of mercury and alkali constituents of the glass (such as sodium and potassium) present on or near the inner surface of the discharge envelope.

The above-mentioned phenomenon occurs particularly at areas at which the discharge is in direct contact with the glass wall. This is the case in lamps in which the discharge envelope is entirely or partly free from luminescent material, as in irradiation lamps and copying lamps. It is further described that first an organic liquid, in which finely divided silicon dioxide is dissolved, is deposited on the inner wall of the discharge envelope for the formation of the said transparent layer. Subsequently, the whole is dried and, in order to obtain a satisfactory adhesion to the wall of the discharge envelope, sintered to a temperature which is slightly lower than the softening temperature of the glass of the wall. This process is time-consuming and expensive. Moreover, there is a risk that unevenness occur in the layer. This may result, during operation of the lamp, in undesired dark spots and dots visible on the wall of the discharge envelope.

The invention has for its object to provide a method of manufacturing a low-pressure mercury vapor discharge lamp, in which the inner wall of the discharge envelope is provided in a simple manner with a silicon dioxide-containing transparent layer and attack and blackening of the glass wall of the discharge envelope during operation of the lamp is reduced.

The method according to the invention is therefore characterized in that electrical conductors are arranged on both sides of the wall of the discharge envelope and, while heating the wall of the discharge envelope, a direct current is maintained in the glass between the conductors for such a period that a thin continuous silicon dioxide-containing layer is formed at the inner surface of the discharge envelope. This layer is substantially free from alkali and/or alkaline earth constituents.

By means of the method according to the invention, a protective silicon dioxide-containing continuous layer is produced in the discharge envelope in a simple manner. Expensive and time-consuming steps during the manufacture, such as the preparation and the use of special organic solvents for the formation of the thin layer as well as the use of a special drying and sintering process, are avoided.

The invention is based on the idea that an electric direct current is maintained in the glass by the disposition of the conductors on both sides of the glass wall of the discharge envelope, as a result of which the relatively mobile alkali and alkaline earth constituents in the glass (such as, for example, sodium, potassium and calcium ions) move towards the outer surface of the wall. Oxygen ions from the glass move towards the area at which all the (earth alkaline) alkali ions have disappeared from the glass (near and on the inner surface). It has been found that a rare gas plasma can serve as a conductor inside the discharge envelope. In the method according to the invention, there is formed at the inner surface of the glass wall a thin layer (in a practical embodiment approximately 50 to 100 nm) which is free from the (alkaline earth) alkali constituents, penetration of mercury into the glass being avoided. It is essential in the method that during the current passage the glass is heated. The temperature then depends upon the glass to be used and is generally higher than 200° C. In a practical embodiment, the glass wall is heated to a temperature of, for example, 450° C. (just below the softening temperature of the glass), the glass relaxing and being converted into the continuous isolating quartzy layer (the silicon dioxide-containing layer). This layer extends over the whole inner wall of the discharge envelope.

As a result of the method used, the smaller mobility of the alkaline earth ions with respect to the alkali ions causes a second thin layer to be produced between the quartzy surface layer and the inner part of the glass, which layer is enriched with alkaline earth ions (such as calcium ions) and is also substantially free from alkali constituents. (The second layer contains, for example, calcium silicate).

In a preferred embodiment of the method according to the invention, a rare gas plasma, such as an argon plasma, is present in the discharge envelope as an electrical conductor, the glass wall acting as negative conductor for the plasma and the anode for the plasma being disposed at an end of the (preferably tubular) discharge envelope. The whole inner surface of the discharge envelope has then formed on it a uniform silicon dioxide-containing layer which is free from undesired ions originating from the conductor. In an embodiment two anodes are constituted, by electrodes which are arranged in the discharge envelope and between which a discharge is maintained during the (later) operation of the lamp. As a result of the direct current in the glass, negative ions (especially oxygen ions) and electrons are released from the inner wall (cathode action). In a practical embodiment, a negatively charged body of an electrically conducting material is arranged on the outer side around the discharge envelope, which body is in contact with the glass wall of the discharge envelope at at least a number of points regularly spaced apart. In the glass of the whole wall a substantially uniform density of the direct current is then obtained. In a practical embodiment, the negatively charged body is a sleeve of a feltlike material, such as graphitic carbon, which is capable of withstanding the comparatively high temperature during heating of the glass wall and does not oxidize. In an embodiment, for some time (for example, approximately 40 sec) a voltage difference of approximately 500 V is applied between this conductor and the conductor (an anode) present in the discharge envelope. Beforehand and during this process, the glass wall (which in said practical embodiment has a thickness of approximately 1 mm) is heated to a temperature of approximately 450° C., as a result of which the continuous transparent silicon dioxide-containing layer having a thickness of approximately 50 nm is produced on the inner wall of the discharge envelope.

The method according to the invention is preferably used in the manufacture of lamps having discharge envelope which are free at least in part from luminescent material, as, for example, in irradiation lamps and copying lamps.

However, the method may also advantageously be used in the manufacture of low-pressure mercury vapor discharge lamps, in which the whole inner wall of the discharge envelope is provided with a luminescent material. The discharge envelope is then first provided in a usual manner with a luminescent layer, which is dried and sintered, whereupon the electrodes are arranged in the discharge envelope the discharge envelope is evacuated etc. and subsequently this envelope is subjected to a treatment in accordance with the method of the invention. It has been found that a lemp thus manufactured had a lower lumen loss with respect to time than a lamp which had not been subjected to such a treatment. In another embodiment, first the inner wall of the discharge envelope is subjected to a treatment according to the method, after which a luminescent layer is applied. It has been found that no alkali (alkaline earth) atoms were present in the luminescent material even after the sintering step to 600° C.

The invention will be described more fully with reference to the drawing.

In the drawing

Figure 2:
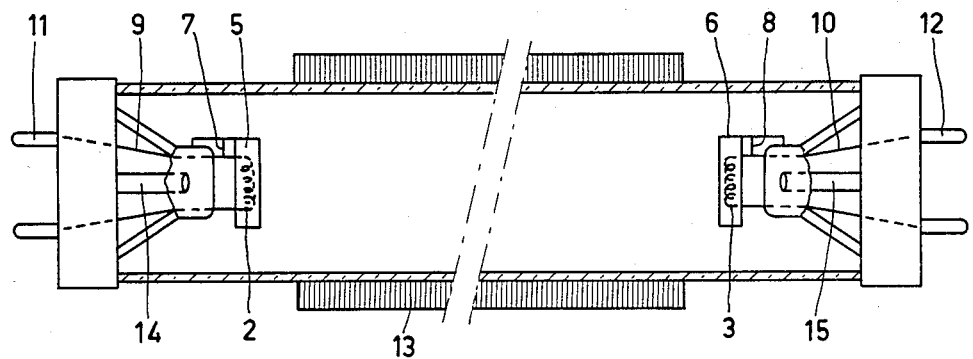

FIG. 1 shows a cross-section of a tubular discharge envelope of a lamp manufactured by a method according to the invention, FIG. 2 shows a processing step of the method according to the invention.

In FIG. 1, reference numeral 1 designates a tubular discharge envelope of a low-pressure mercury vapor discharge lamp. Two electrodes 2 and 3 are arranged at the ends of the discharge envelope. During operation of the lamp, a discharge is maintained between these electrodes. The inner wall of the discharge envelope is completely free from luminescent material. The glass of the wall of the discharge envelope has the following composition (% by weight): 72.3% of $SiO_2$; 16.9% of $Na_2O$; 0.8% of $K_2O$; 5.3% of $CaO$; 2.6% of $MgO$; 1.7% of $Al_2O_3$; 0.33% of $Sb_2O_3$; 0.12% of $Fe_2O_3$.

A continuous transparent protective layer 4 containing silicon dioxide is present on the whole inner side of the wall. This layer has been produced with the aid of the method according to the invention, which is explained with reference to FIG. 2.

In this method, the discharge envelope is first closed and provided with argon at a pressure of 400 Pa. In the discharge envelope, there are arranged in the proximity of the electrodes 2, 3 respective titanium plates 5,6, which are each connected through a respective wire 7 and 8, to a respective one of the supply wires 9, 10 of the electrodes. A positive voltage is applied to the connection wires 11, 12 connected to these supply wires. Each titanium plate 5,6 is then charged positively and acts as an anode for the argon plasma in the discharge envelope. A negatively charged electrical conductor is arranged around the outer wall of the discharge envelope. This conductor consists of an elastic felt-like blanket of graphite carbon in the form of a sleeve 13 (thickness 10 mm). The sleeve bears on the outer wall of the discharge envelope 1. A voltage difference of approximately 500 V is applied between the sleeve 13 and the titanium plates 5,6 for approximately 40 sec. A direct current is then produced in the glass between plates 5,6 and sleeve 13, as a result of which the relatively mobile alkali and alkaline earth constituents in the glass move towards the outer wall of the discharge envelope. The current density in the glass then decreases from 750 $mA/cm^2$ to 100 $mA/cm^2$. A part of the oxygen ions present in the glass moves towards the inner wall and even moves to the plasma present in the discharge envelope. The oxygen ions are conducted away with the aid of a gas current (argon) through the exhaust tubes 14, 15 connected to a pump. Before and during the maintenance of the direct current in the glass, the discharge envelope is heated to a temperature of approximately 450° C. The body 13 is not attacked by oxidation. Due to this heating, the glass relaxes at the inner surface and is converted into a thin continuous isolating quartzy layer of silicon dioxide, which is free from alkali and/or alkaline earth constituents. After the glass wall has been exposed to the direct current during the period of time, the connection wires 7 and 8 are melted by high energy current pulses. Finally, the mercury is dosed in the discharge envelope (cf., for example, GB-PS 1,475,458), whereupon the lamp (20 W, length 40 cm, diameter 2.5 cm) is ready for use. It has been found that the decrease of the radiation output of this lamp amounted to only 2% after 8000 operating hours.

What is claimed is:

1. A method of manufacturing a low-pressure mercury vapor discharge lamp which comprises:
   providing a tubular discharge envelope, having a glass wall which comprises a material selected from the group consisting of alkali and alkaline earth materials;
   arranging two electrodes at the ends of said envelope for maintaining the discharge during the operation of the lamp;
   providing a flow of rare gas in said envelope;
   providing a negatively charged electrode on the outer wall surface of said envelope and heating the glass wall of said envelope while maintaining a direct current in the glass between said negatively charged electrode and an anode which is present inside the envelope disposed at least proximate to one of said two electrodes to form a thin continuous silicon-dioxide-containing layer at the inner surface of the discharge envelope which is substantially free from alkali and/or alkaline earth constituents, the conducting medium between said negatively charged electrode and said anode inside the envelope comprising a rare gas plasma, and removing oxygen ions from said envelope by said flow of rare gas, and lastly sealing said envelope.

2. The method as described in claim 1 wherein said rare gas is argon.

3. A method as claimed in claim 1 or 2, characterized in that the conductor on the outside of the envelope comprises a negatively charged body of an electrically conducting material arranged around the discharge envelope, said body being in contact with the glass wall of the discharge envelope at at least a number of points which are spaced apart at regular intervals.

4. A method as claimed in claim 3, characterized in that the negatively charged body consists of a sleeve of graphitic carbon.

* * * * *